United States Patent [19]

Iijima et al.

[11] 3,906,446

[45] Sept. 16, 1975

[54] PATTERN IDENTIFICATION SYSTEM

[75] Inventors: Taizo Iijima, Tokyo; Kenichi Mori, Yokohama, both of Japan

[73] Assignees: Taizo Iijima, Tokyo, Japan; Tokyo Shibaura Electric Co., Ltd., both of Tokyo, Japan

[22] Filed: Aug. 7, 1974

[21] Appl. No.: 496,012

[30] Foreign Application Priority Data

Aug. 8, 1973 Japan ................................ 48-88537

[52] U.S. Cl. ................ 340/146.3 MA; 340/146.3 Q

[51] Int. Cl.$^2$ ........................................... G06K 9/12

[58] Field of Search ........... 340/146.3 MA, 146.3 R, 340/146.3 Q; 235/197

[56] References Cited

UNITED STATES PATENTS

| | | | |
|---|---|---|---|
| 3,688,267 | 8/1972 | Iijima et al. | 340/146.3 MA |
| 3,790,955 | 2/1974 | Klemt | 340/146.3 MA |
| 3,810,093 | 5/1974 | Yasuda et al. | 340/146.3 MA |

*Primary Examiner*—Leo H. Boudreau
*Attorney, Agent, or Firm*—Cushman, Darby & Cushman

[57] ABSTRACT

As reference patterns belonging to any one of categories, M number of reference patterns satisfying an orthonormal relation to each other and N number of reference patterns having an orthonormal relation to each of the M number of reference patterns and satisfying an orthogonal relation to each other are prepared. Whether or not a category-unknown input pattern belongs to a specified category is determined dependent upon whether or not a difference between the sum of squares of values each representing the similarity of the input pattern to each of M number of reference patterns and the sum of squares of values each representing the similarity of the input pattern to each of N number of reference patterns is greater than a predetermined threshold value.

15 Claims, 19 Drawing Figures

PATTERN IDENTIFICATION SYSTEM

This invention relates to a pattern identification system based on the similarity of an input pattern to a reference pattern.

This application is concerned with an improvement over the invention disclosed in U.S. Pat. No. 3,688,267 issued on Aug. 29, 1972 and granted to the inventor of this invention. Some circuits disclosed in the U.S. Patent may be employed in the practice of this invention. The prior art including U.S. Pat. No. 3,688,267 will be explained below.

A variety of pattern identification systems have been proposed to this date. Out of these systems a pattern matching method or a simple similarity method is well known as attaining a relatively high identification. According to this method identification is attained by ascertaining to what extent a given input pattern is similar to a reference pattern.

A pattern is described on a two-dimensional plane and an infinite number of patterns can be expressed on this plane. These patterns constitute an infinite set. In the above-mentioned identification method, a set of points permitting one-to-one correspondence is considered with respect to an individual pattern and this is defined as a pattern space. In the pattern space the similarity is determined by vectors corresponding to the pattern.

FIG. 1A shows a relation between a pattern set and a pattern space. In this Figure, the origin of vectors in the pattern space corresponds to a white pattern, and the length of each vector corresponds to the density of each of the other patterns in the pattern set.

The respective pattern is expressed as a function $f(x)$ relating to a position vector $x$ defined in a two-dimensional region R.

If a continuous pattern $f(x)$ is divided into a suitable number of squares L as shown in FIG. 1B and the densities of the squares are represented by average values $f_1, f_2, \ldots f_r, \ldots f_L$ showing the density of each square, the pattern $f(x)$ can be expressed by vectors $f_1, f_2, \ldots f_r \ldots f_L$ corresponding to L number of values.

The principle of the above-mentioned simple similarity method will be explained below in more detail.

With an input pattern represented by $f(x)$ and a reference pattern by $f_0(x)$, the degree of similarity $S[f, f_0]$ of the input pattern $f(x)$, to the reference pattern $f_0(x)$, is defined by $$S[f, f_0] = \frac{(f, f_0)}{\|f\| \, \|f_0\|} \quad (1)$$

in which $(f, f_0)$ denotes an inner product calculated between $f(x)$ and $f_0(x)$ and is expressed as follows:

$$(f, f_0) = \int_R f(x) f_0(x) dx \quad (2)$$

$x$ is defined in the region R.

$\|f\|$ is referred to as the norm of $f(x)$ and shows a positive value defined by:

$$\|f\| = \sqrt{(f, f)} \quad (3)$$

Likewise, $f$O is referred to as the norm of $f_0(x)$. The norm $\|f\|$ represents the distance of the pattern $f(x)$ as measured from the origin in the pattern space, and the norm $\|f_0\|$ represents the distance of the pattern $f_0(x)$ as measured from the origin in the pattern space. A pattern $f_0(x) \equiv 0$ corresponding to the white pattern represents the origin of the pattern space. With $\theta$ representing an angle made between two vectors drawn from the origin toward $f(x)$ and $f_0(x)$, respectively, the so defined similarity $S[f, f_0]$ corresponds to cos $\theta$ and assumes a certain value in a range $$-1 \leqq S[f, f_0] \leqq 1 \quad (4)$$

particularly when $f(x)$ is exactly identical with $f_0(x)$, $$\lim_{f(x) \to f_0(x)} S[f, f_0] = 1 \quad (5)$$

At $\epsilon > 0$ ($\epsilon$ is any positive number less than, or equal to, 1), if the relation $$S[f, f_0] > 1 - \epsilon \quad (6)$$

is satisfied, the pattern $f(x)$ can be identified as belonging to the pattern $f_0(x)$ and, if not, the pattern $f(x)$ can be identified as not belonging to the pattern $f_0(x)$.

The above-mentioned method for determining the similarity of the input pattern to the reference pattern using the equation (1) is called the simple similarity method.

The similarity $S[f, f_0]$ remains unaffected if the density of the density function $f(x)$ amounts, as a whole, to A times the original density to be expressed as $Af(x)$ where A is an arbitrary constant. Consequently, where a pattern (for example, a letter) of such nature that even if the pattern is subject to density variation a category belonging to $f(x)$ is not changed is to be identified, the above-mentioned simple similarity method will prove very convenient.

However, a normal pattern is susceptible to some deformations due to a variety of causes, in addition to density variation. Where, for example, the position of a reference pattern is displaced, the simple similarity S is directly affected, representing a value departed from a true value.

This presents a bar to the improvement of identifiability based on the simple similarity method. To obviate the disadvantages a multiple similarity method has been proposed.

In the multiple similarity method, M number of patterns $\phi_1(x), \phi_2(x), \ldots \phi_M(x)$ having an orthogonal relation with respect to each other are prepared as reference patterns in place of a single reference $f_0(x)$ representing a specified category. When an input pattern $f(x)$ is given, M number of similarities $S[f, \phi_m]$ ($m = 1, 2, \ldots, M$) between the input pattern $f(x)$ and the M number of reference patterns are calculated. From these, $$S^*[f] = \sqrt{\sum_{m=1}^{M} \{S[f, \phi_m]\}^2} \quad (7)$$

is obtained.

In this case, identification is effected dependent upon whether or not the value of $S^*[f]$ satisfies the following inequality.

$$S^*[f] > 1 - \epsilon \; (1 >> \epsilon > 0) \quad (8)$$

The value of the multiple similarity $S^*[f]$ defined by the equation (7) remains unaffected even if the position of the reference pattern is displaced in the pattern space. As shown in FIG. 2 (a view for explaining a difference between the simple similarity method and the multiple similarity method), with $\theta^*$ representing an angle made between the input pattern $f(x)$ and that component of $f(x)$ projected on a hiperplane G formed by the movement of the reference pattern, the value $S^*[f]$ obtained based on the multiple similarity method corresponds to cos $\theta$. This means that the similarity of the input pattern $f(x)$ to the reference pattern allowed to be moved is judged.

In this way, the multiple similarity method has the function for effecting identification with respect to a pattern similar to any one of the M number of reference patterns and with respect to all patterns freely moved on a certain hipersurface in the pattern space defined by the reference pattern. This method, therefore, constitutes a significant departure from the simple similarity method.

The identification system based on the multiple similarity method is capable of effecting stable identification irrespective of any deformation to which a pattern belonging to a certain category is subjected. However, where different categories — for example, a numerical figure "0" and an English letter "O"; a numerical figure "1" and an English letter "I"; a numerical figure "5" and an English letter "S"; etc. — showing a relatively high similarity to each other are existent, no high identifiability can be attained in an attempt to distinguish between the pattern of one categorry and the pattern of the other category.

Any theoretical explanation as to the reason for this will be omitted in view of its complexity. To explain qualitatively, as will be understood from the explanation of the multiple similarity method, the multiple similarity method assures a discrimination between the patterns each belonging to one category, but no consideration is paid to the problem of discriminating between the pattern of one category and the pattern of the other category.

It is accordingly an object of this invention to provide a pattern identification system directed to the settlement of the above-mentioned problem as encountered in the prior art and capable of attaining a high distinguishability between easily confusable patterns each belonging to a different category, while making the best use of the advantages of a multiple similarity method.

Now consider K number of categories to which a pattern to be identified is referred for identification purpose. M number of reference patterns $\phi_1^{(k)}(x)$, $\phi_2^{(k)}(x)$, . . . $\phi_M^{(k)}(x)$ are preliminarily prepared for any one of K number of categories, for example, $k$—$th$ category. It is to be noted that these reference patterns satisfy an orthnormal relation.

$$(\phi_m^{(k)}, \phi_{m'}^{(k)}) = \begin{cases} 1(m=m') \\ 0(m \neq m') \end{cases} \quad (m, m' = 1, 2, \ldots M) \tag{9}$$

The expression "orthonormal" is herein used in the mathematical parlance and is different from "normalization" used in the pattern recognition. The normalization used in the pattern recognition means that, for example, a displaced character pattern is moved into alignment with a reference position and a hand-written character which is varied from person to person is enlarged or reduced to a predetermined size.

Also prepared for the $k$—$th$ category are N number of reference patterns $\psi_1^{(k)}(x)$, $\psi_2^{(k)}(x)$, . . . $\psi_N^{(k)}(x)$ having those components representing an orthogonal relation to the reference pattern $\{\psi_m^{(k)}(x)\}$ which are included in those patterns showing a relatively high similarity to the $k$—$th$ category and being regarded as belonging to a different category. It is to be noted that the N number of reference patterns $\{\psi_n^{(k)}(x)$: $n = 1, 2, . . . N\}$ satisfy an orthnormal relation $$(\psi_n^{(k)}(x, \psi_{n'}^{(k)}) = \begin{cases} 1(n=n') \\ 0(n \neq n') \end{cases} \quad (n, n' = 1, 2, \ldots N) \tag{10}$$

and an orthogonal relation $$(\phi_m^{(k)}, \psi_n^{(k)}) = 0 \quad (m = 1, 2, \ldots M; n = 1, 2, \ldots N) \tag{11}$$

to the reference pattern $\{\phi_m^{(k)}(x)\}$. $\phi_m^{(k)}$ and $\psi_n^{(k)}$ are determined so as to satisfy the relations (9), (10) and (11). $\phi_m^{(k)}$ and $\psi_n^{(k)}$ satisfying these relations exist in infinite number. Consequently, with respect to the components best expressing the distribution of the $k$—$th$ pattern, $\phi_1^{(k)}$, $\phi_2^{(k)}$ . . . . $\phi_m^{(k)}$ can be first determined using the equation (9). Then, $\psi_1^{(k)}$, $\psi_2^{(k)}$, . . . $\psi_n^{(k)}$ can be determined using the equations (10) and (11).

The number of M, N is determined dependent upon the nature of patterns to be identified. Normally, M is selected to correspond to 3 or more and N is selected to correspond to the number of those patterns included in each category which bear a similarity to a specified pattern. For example, an English letter "O" has a similarity to a numerical figure "0" and English Letters "D" and "Q", and in this case, N is selected to correspond to 3. A numerical figure "7" has a similarity to a numerical figure "9" and, in this case, N is selected to correspond to 1.

Therefore, a given pattern $f(x)$ is expandable into the form $$f(x) = \sum_{m=1}^{M} a_m\phi_m^{(k)}(x) + \sum_{n=1}^{N} b_n\psi_n^{(k)}(x) + h^{(k)}(x) \tag{12}$$

using $\{\phi_m^{(k)}(x)\}$ and $\{\psi_n^{(k)}(x)\}$, in which the expansion coefficients $\{a_m\}$, $\{b_n\}$ are respectively given as follows:

$$\begin{cases} a_m = (f, \phi_m^{(k)}) & (m = 1, 2, \ldots M) \\ b_n = (f, \psi_n^{(k)}) & (n = 1, 2, \ldots N) \end{cases} \tag{13}$$

An inner product between the right side of the equation (12) and $\phi_m^{(k)}$ is expressed as follows:

$$f(x), \phi_m^{(k)}) = \sum_{m=1}^{M} a_m(\phi_m^{(k)}(x), \phi_m^{(k)}(x) + \sum_{n=1}^{N} b_n(\psi_n^{(k)}(x), \phi_m^{(k)}(x) + (h^{(k)}(x), \phi_m^{(k)}(x)).$$

The inner product can be rewritten as $(f(x), \phi_m^{(k)}) = a_m + (h^{(k)}(x), \phi_m^{(k)}(x))$ taking into consideration the requirement of orthogonality as expressed by the equations (9) and (11).

From the expression (13), $$(h^{(k)}(x), \phi_m^{(k)}(x)) = 0 \tag{14a}$$

Likewise, $$(h^{(k)}(x), \psi_n^{(k)}(x)) = 0 \qquad (14b)$$

It can be said that the reminder $h^{(k)}(x)$ satisfies the equations (14a) and (14b).

From an inner product between $f(x)$ and $f(x)$, the squared value of a norm can be expressed as follows:

$$\| f \|^2 = (f(x), f(x))$$

$$= (\sum_{m=1}^{M} a_m\phi_m^{(k)}(x) + \sum_{n=1}^{N} b_n\psi_n^{(k)}(x)$$

$$+ h^{(k)}(x)) \ (\sum_{m=1}^{M} a_m\phi_m^{(k)}(x) + \sum_{n=1}^{N} b_n\psi_n^{(k)}(x) + h^{(k)}(x))$$

$$= \sum_{m=1}^{M} \sum_{m'=1}^{M} a_m a_m \ (\phi_m^{(k)}(x), \phi_m{}^{(k)}(x)$$

$$+ \sum_{m=1}^{M} \sum_{n=1}^{N} a_m b_n (\phi_m^{(k)}(x), \psi_n^{(k)}(x)$$

$$+ \sum_{m=1}^{M} a_m(\phi_m^{(k)}(x), h^{(k)}(x))$$

$$+ \sum_{n=1}^{N} \sum_{m=1}^{M} b_n a_m (\psi_n^{(k)}(x), \phi_m^{(k)}(x))$$

$$+ \sum_{n=1}^{N} \sum_{n'=1}^{N} b_n b_n \ (\phi_n^{(k)}(x), \psi_n{}^{(k)}(x)$$

$$+ \sum_{n=1}^{N} b_n(\psi_n^{(k)}(x), h^{(k)}(x) + \sum_{m=1}^{M} a_m(0i\ h^{(k)}(x), \phi_m^{(k)}(x))$$

$$+ \sum_{n=1}^{N} b_n(h^{(k)}(x), \psi_n^{(k)}(x)) + \| h^{(k)}(x) \|^2$$

From the equation (9), the first term on the right side of the above-mentioned equality becomes $$\sum_{m=1}^{M} a_m^2;$$

from the equation (11), the second and fourth terms become zero; from the equation (14), the third, sixth, seventh and eighth terms become zero; and from the equation (10), the fifth term becomes $$\sum_{n=1}^{N} b_n^2.$$

Thus, the above-mentioned equation is rewritten as follows:

$$\| f \|^2 = \sum_{m=1}^{M} a_m^2 + \sum_{n=1}^{N} b_n^2 + \| h^{(k)} \|^2 \qquad (15)$$

Now the similarity $C^{(k)}[f]$ — hereinafter referred to as "a mixed similarity" — of any input pattern $f(x)$ to the reference pattern belonging to the $k-th$ category is defined as follows:

$$C^{(k)}[f] = \sum_{m=1}^{M} \lambda_m\{S[f, \phi_m^{(k)}]\}^2 - \sum_{n=1}^{N} \mu_n\{S[f, \phi_n^{(k)}]\}^2 \qquad (16)$$

in which the parameters $\lambda_m$, $\mu_n$ are real numbers included in the range $$\begin{cases} 1 = \lambda_1 \geqq \lambda_2 \geqq \ldots \geqq \lambda_M > 0 \\ 1 \geqq \mu_1 \geqq \mu_2 > \ldots > \mu_N > 0 \end{cases} \qquad (17)$$

Substituting the equation (1) in the equation (16), $$C^{(k)}[f] = \sum_{m=1}^{M} \lambda_m \frac{(f, \phi_m^{(k)})^2}{\| f \|^2 \| \phi_m^{(k)} \|^2}$$

$$- \sum_{n=1}^{N} \mu_n \frac{f, \psi_n^{(k)})^2}{\| f \|^2 \| \psi_n{}^{(k)} \|^2}$$

From the expressions (9) and (13), $$C^{(k)}[f] = \sum_{m=1}^{M} \lambda_m \frac{a_m^2}{\| f \|^2} - \sum_{n=1}^{N} \mu_n \frac{b_n^2}{\| f \|^2}$$

$$= \frac{1}{\| f \|^2} \{ \sum_{m=1}^{M} \lambda_m a_m^2 - \sum_{n=1}^{N} \mu_n b_n^2 \} \qquad (18)$$

The equation (16) may also be expressed as follows:

$$C^{(k)}[f] = \frac{1}{\| f \|^2} \{ \sum_{m=1}^{M} \lambda_m a_m^2 - \sum_{n=1}^{N} \mu_n b_n^2 \}$$

$$= \frac{1}{\| f \|^2} (\| f \|^2 - \| h^{(k)} \|^2) \ \frac{\sum_{m=1}^{M} \lambda_m a_m^2 - \sum_{n=1}^{N} \mu_n b_n^2}{\| f \|^2 = \| h^{(k)} \|^2}$$

From the equation (15), $$= (1 - \frac{\| h^{(k)} \|^2}{\| f \|^2}) \ [\frac{\sum_{m=1}^{M} \lambda_m a_m^2 - \sum_{n=1}^{N} \mu_n b_n^2}{\sum_{m=1}^{M} a_m^2 + \sum_{n=1}^{N} b_n^2}]^2$$

$$= (1 - \frac{\| h^{(k)} \|^2}{\| f \|^2})$$

$$[\frac{\sum_{m=1}^{M} a_m^2 + \sum_{n=1}^{N} b_n^2 - \sum_{m=1}^{M} (1-\lambda_m(a_m^2 - \sum_{n=1}^{N} (1+\mu_n)b_n^2}{\sum_{m=1}^{M} a_m^2 + \sum_{n=1}^{N} b_n^2}]$$

$$= (1 - \frac{\| h^{(k)} \|^2}{\| f \|^2})$$

$$[1 - \frac{\sum_{m=1}^{M} (1-\lambda_m)a_m^2 + \sum_{n=}^{N} (1+\mu_n)b_n^2}{\sum_{m=1}^{M} a_m^2 + \sum_{n=1}^{N} b_n^2}] \qquad (19)$$

As will be evident from the equation (16), the mixed similarity $C^{(k)}[f]$ takes any real number included in the range $$-1 \leqq C^{(k)}[f] \leqq 1 \qquad (20)$$

Particularly when the input pattern is $$f(x) = a_1\phi_1^{(k)}(x),$$

since, from the equation (12), $N=0$, $M=1$, and $h^{(k)}(x)=0$, $$C^{(k)}[f] = \frac{1}{\| f \|^2} \lambda \, a|^2 = \frac{\lambda|a|^2}{a_1^2(\phi_1^{(k)}(x), \phi^{(k)}(x)} = \lambda_1$$

Since, from the equation (17), $\lambda_1 = 1$, $$C^{(k)}[f] = C^{(k)}[a_1\phi_1{}^{(k)}] = 1 \qquad (21)$$

$|a_m|$ and $|b_m|$ included in the equations (12) and (15) represent the magnitude of projection components of the input pattern $f(x)$ relating to $\phi_m^{(k)}(x)$, $\phi_n^{(k)}(x)$. This will be easily understood from the explanation made in connection with the equation (3).

On the other hand, $\| h^{(k)} \|$ represents the magnitude of a remainder other than $\{\phi_m^{(k)}(x), \psi_n^{(k)}(x)\}$. Consequently, it can be said that the equation (19) shows the way how these components affect the value of the mixed similarity $C^{(k)}[f]$. Namely, the first term on the right side of the equation (19) shows the effect imparted by $\| h^{(k)} \|$ and the second term on the right side thereof shows the effects imparted by $\{|a_m|\}$, $\{|b_n|\}$. Since $$\begin{cases} (1-\lambda_m)a_m^2 < a_m^2 \\ (1+\mu_n)b_n^2 > b_n^2 \end{cases} \quad (22)$$

the equation (19) reveals that $|a_m|$ is evaluated as being smaller than the extent to which the parameter is actually subjected to deformation, while $|b_n|$ is evaluated as being greater than the extent to which the parameter is actually subjected to deformation. In other words, the mixed similarity $C^{(k)}[f]$ has such a characteristic that with respect to the deformation components allowed for the $k$—$th$ category under consideration a tolerant discriminatory evaluation is effected and that with respect to the easily confusable components a severe discriminatory evaluation is effected.

Let us explain this meaning qualitatively by taking as an example the case where the input pattern is a numeral figure "0" and the reference pattern is an English letter "O". These patterns "0" and "O" are rendered confusable due to a close similarity to each other if any of these patterns is subjected to deformation. If, however, these patterns are subjected to a density variation as a whole or varied while maintaining a "similar correspondence", there is no risk of confusion. Where the numerical figure "0" is bulged in its width direction, any discrimination between "0" and "O" will cease to exist. Now consider, by way of another example, the case where the input pattern is a numerical figure "1" and the reference pattern is an English letter "I". These patterns will be rendered confusable, if the lateral bar or projection at the top of "I" or "1" is varied. That is, the numerical figure "1" will be identified if no lateral bar is projected to the right side at the top of the pattern "1". The English letter "I" will be identified if a laterial bar is projected to the right side at the top of the pattern "I". Identification can also be made dependent upon whether the lateral bar at the top of the pattern "1" or "I" is slanted or not. In this case, a discrimination between "I" and "1" can be attained even if a lateral bar at the bottom of the numerical figure "1" is subjected to some deformation. In this way, there are two type of components: one type identifiable even if such deformation occurs between the patterns similar to, but different in category, from each other; and the other type indistinguisable when such deformation takes place. According to the mixed similarity method of this invention a talerant discriminatory evaluation is made with respect to the former type of component and a severe discriminatory evaluation is made with respect to the latter type of component i.e. any deformation is evaluated as if no major deformation occurs.

Now suppose that at $1 >> \epsilon > 0$ ($\epsilon$ is positive number) the relation $$C^{(k)}[f] > 1 - \epsilon \quad (23)$$

is given. Then, whether or not the input pattern $f(x)$ belongs to the $k$—$th$ category is determined dependent upon whether or not the relation is satisfied. In this case, the determination is made under the above-mentioned evaluation. In the above-mentioned mixed similarity method, if $N = 0$, $$C^{(k)}[f] = \frac{1}{\|f\|^2} \sum_{m=1}^{M} \lambda_m a_m^2$$

At $\lambda_m = 1$ and $a_m = (f, \phi_m^{(k)})$, the above-mentioned equation will be rewritten as follows:

$$C^{(k)}[f] = \frac{1}{\|f\|^2} \sum_{m=1}^{M} (f, \phi_m^{(k)})^2 = \sum_{m=1}^{M} \frac{(f, \phi_m^{(k)})^2}{\|f\|^2}$$

Multiplying the denominator of the right side of the above-mentioned equation by $\| \phi_n \|^2 = 1$, $$C^{(k)}[f] = \sum_{m=1}^{M} \frac{(f, \phi_m^{(k)})^2}{\|f\|^2 \cdot \|\phi_m\|^2} = \sum_{m=1}^{M} S[f, \phi_m^{(k)}]^2$$

If the square root of the right side of the above-mentioned equation is regarded as $S^*[f]$, then $$S^*[f] = \sqrt{\sum_{m=1}^{M} \{S[f, \phi_m^{(k)}]^2\}} \quad (24)$$

which corresponds to the multiple similarity shown in the equation (7).

If $M = 1$, $$S^*[f] = \sqrt{S[f, \phi_1]^2} = S[f, \phi_1]$$

If $\phi_1 = f_0$, $$S = [f, f_0]$$

which is identical with the simple similarity shown in the equation (1).

From the foregoing it will be understood that the mixed similarity method constitutes an extension of the simple and multiple similarity methods.

The mixed similarity method has been theoretically explained. In the identification system, the preparation of a sample is effected. A continuous input pattern $f(x)$ is expressed as density values on L number of sample points, and $f(x)$ is given in the form $(f_1, f_2, \ldots f_r, \ldots f_L)$. Then, an inner product between the two patterns $f(x)$ and $g(x)$ is expressed not in the integral form defined by the equation (2), but in the form:

$$(f, g) = \sum_{r=1}^{L} f_r, g_r \quad (25)$$

It is well known that the equation (2) can be rewritten in the multiplying-summing form as shown in the equation (25) using a known sampling theorem. If any input pattern can be expressed as vector components $(f_1, f_2, \ldots f_L)$ and the inner product of the equation (25) is definable, the discussions made in connection with the mixed similarity method can all hold true.

The equation of the mixed similarity method can be reduced to $$\sum_{m=1}^{M} (f \cdot \sqrt{\lambda_m}\phi_m^{(k)})^2 - \sum_{n=1}^{N} (f, \sqrt{\mu_n}\psi_n^{(k)})^2 > (1-\epsilon)\|f\|^2 \quad (26)$$

which is obtained by substituting the equation (18) in the equation (23) and using the equation (13).

In the equation (26) the parameters $\lambda_m$, $\mu_n$ are preliminarily prepared as known quantities.

Therefore, it is only required to realize a pattern identification system capable of determining whether or not the above-mentioned parameters satisfy the equation (26) with respect to the input pattern $f$.

This invention will be further explained with respect to the accompanying drawings, in which.

Figure 15:
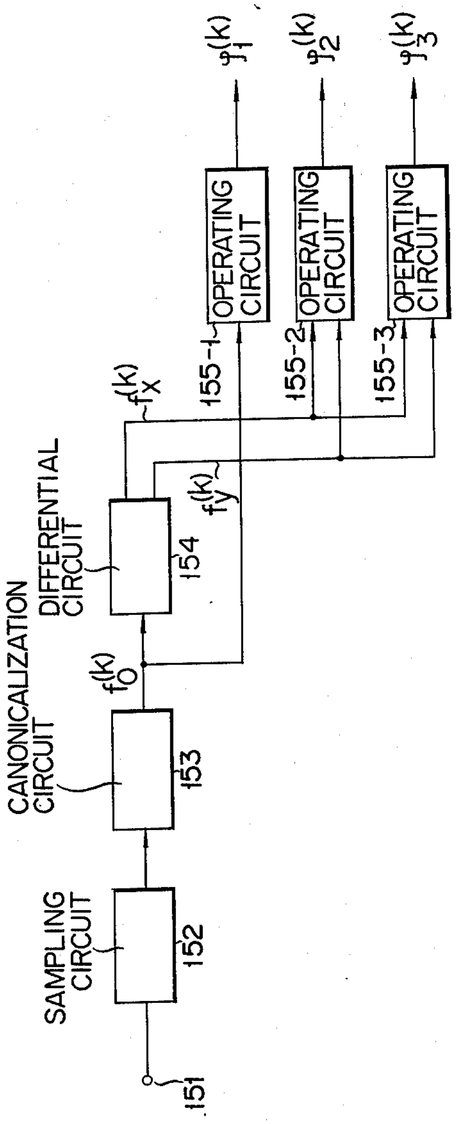

FIGS. 14($a$) – 14($c$) show three examples of an orthonormal pattern used in this invention and FIG. 14($d$) shows a reference pattern belonging to a $k$—$th$ category; and FIG. 15 is a block diagram showing a circuit for preparing the patterns of FIGS. 14($a$) – 14($c$) from the pattern of FIG. 14($d$).

Figure 1A:
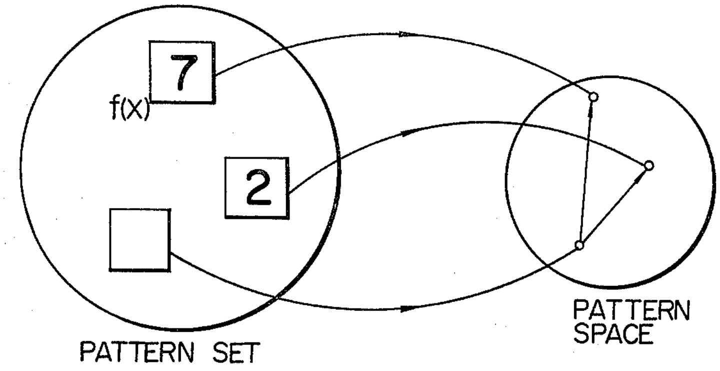
FIG. 1A is a view showing the positional relation, in a pattern space, of patterns belonging to a specified category.
Figure 1B:
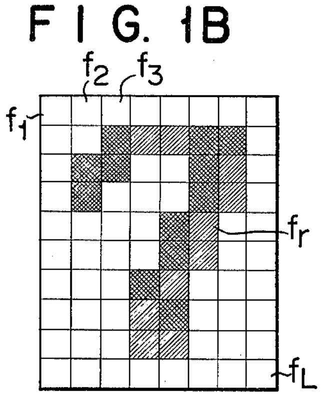
FIG. 1B is a view showing a numerical figure "7" displayed by the varying density of a plurality of squares.
Figure 2:
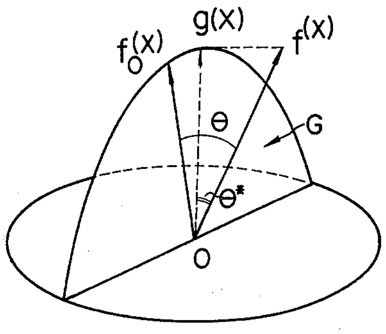
FIG. 2 is a view showing a relative relation between a simple similarity method and a multiple similarity method.
Figure 3:
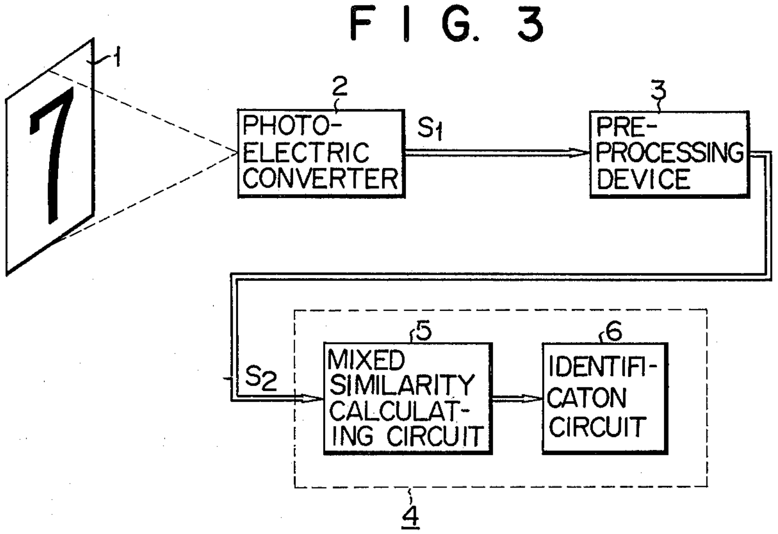
FIG. 3 is a block diagram showing the fundamental arrangement according to one embodiment of a pattern identification system of this invention.

In FIG. 3 an input pattern 1, for example, a numerical figure "7" written on a white paper is scanned by a photoelectric converter 2 having a scanning device such as a flying spot scanner, and an electrical signal $S_1$ corresponding to the shade of the pattern 1 is obtained through scanning. The electrical signal $S_1$ is delivered to a pre-processing device 3 where it is subjected to pre-processing such as nomalization of the position and thickness of input pattern and sampling of the pattern. An output signal $S_2$ of the pre-processing device is supplied to a mixed similarity calculating circuit 5 in a pattern identification section 5. The output signal of the calculating circuit 5 is supplied to an identification circuit where the input pattern is identified. The photoelectric converter 2 and pre-processing circuit 3 may be of conventional types.

Figure 4:
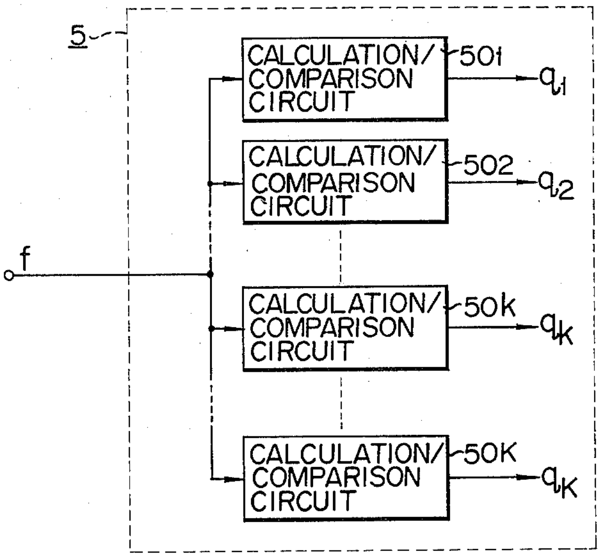
FIG. 4 is a block diagram schematically showing a mixed similarity calculating circuit in FIG. 3.

FIG. 4 is a block diagram showing a mixed similarity calculating circuit shown in FIG. 3. The output signal $S_2$, i.e. input pattern $f$, of the pre-processing circuit is delivered to K number of calculation-comparison circuits 501, 502, . . . 50K. In the calculation-comparison circuits, comparison is made between the input pattern $f$ and K number of categories preliminarily prepared for collation and identification is made as to which category the input pattern $f$ belongs to.

Figure 5:
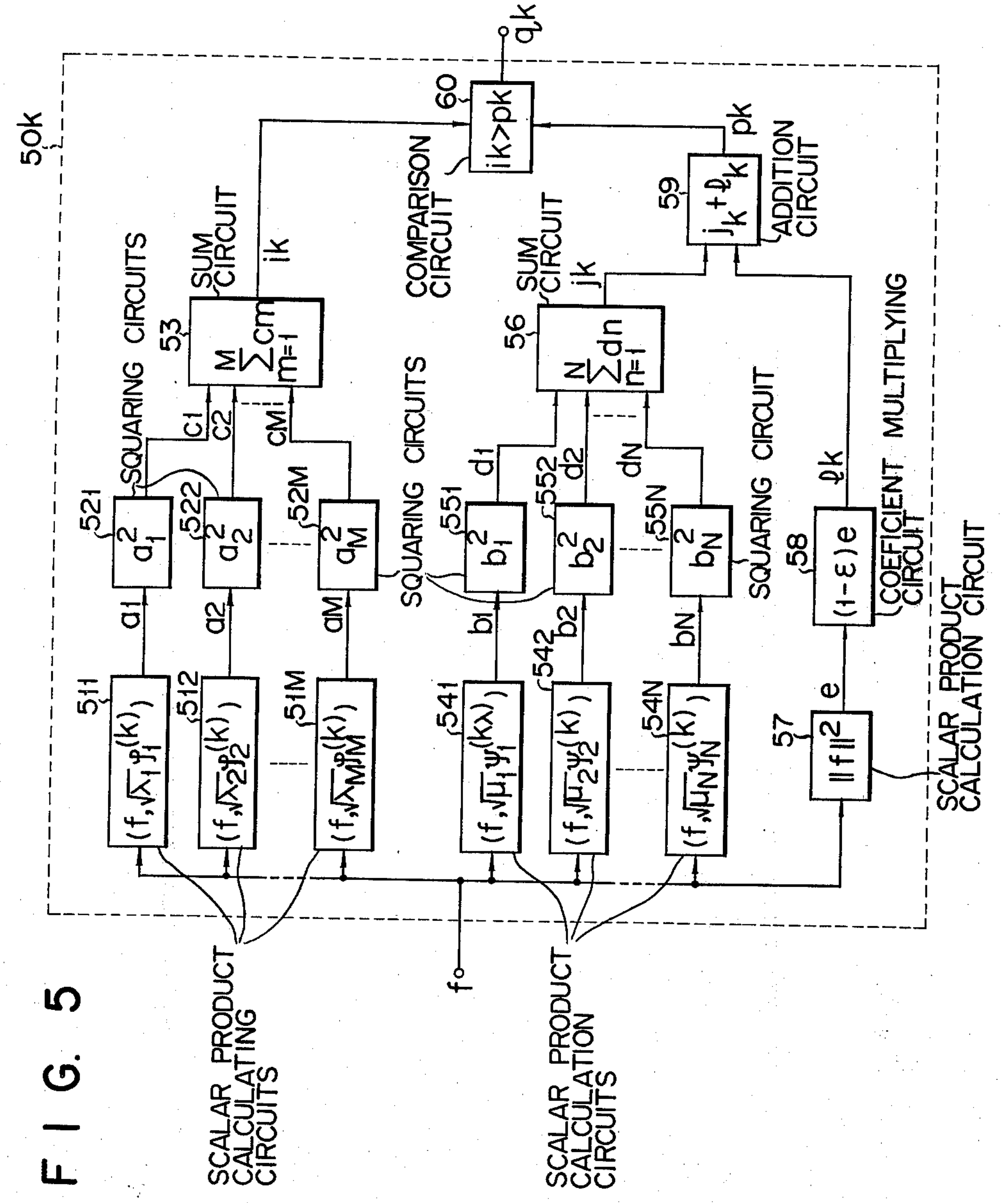
FIG. 5 is a block diagram showing the detailed arrangement of a calculation-comparison circuit of FIG. 4.

FIG. 5 is a block diagram showing a $k$—$th$ circuit (50k) selected, as a representative example, from the computation-comparison circuits shown in FIG. 4. The input pattern f is applied to M number of inner product calculating circuits 511, 512, . . . 51M constituting a first group, and inner product calculations are carried out between the input pattern $f$ and $$\sqrt{\lambda_1}\,\phi_1^{(k)} \cdot \sqrt{\lambda_2}\,\phi_2^{(k)}, \ldots \sqrt{\lambda_M}\,\phi_m^{(k)}$$

FIG. 14 ($a$) – ($c$) show three examples of the orthogonal patterns $\phi_1^{(k)}$, $\phi_2^{(k)}$, . . . $\phi_M^{(k)}$. In these figure, a solid black dot denotes a positive density value, while a shaded dot denotes a negative density value. The size of these dots shows the magnitude of these values. These three patterns respectively satisfy the equation (9) and if with respect to any two of these three patterns the density values of corresponding dots are multiplied and summed, then it comes to a zero. The three orthogonal patterns shown in FIGS. 14($a$) – ($c$) are prepared based on the reference pattern representative of the $k$—$th$ category shown in FIG. 14($d$). The procedure of preparing the patterns of FIGS. 14($a$) and ($c$) from the pattern of FIG. 14($d$) will be explained by reference to FIG. 15. In FIG. 15, a scanning signal scanned over the whole surface of the pattern of FIG. 14($d$) is applied to a terminal 151 and then to a sampling circuit 152. The sampling circuit is, as is conventionally known, so designed as to convert the input pattern into a sampled pattern having a predetermined number of sampling points, in this embodiment, 16 × 16 points. The output of the sampling circuit 152 is applied to a canonicalization circuit 153 where the averaged density value of the pattern is subtracted from the density value corresponding to each point of the sample pattern so prepared. Consequently, a canonicalization pattern obtained from the canonicalization circuit 153 represents a pattern $f_o^{(k)}$ representative of a deviation from the averaged density value. The output of the circuit 153 is supplied to a differential circuit 154 and operation circuit 155 - 1. The differential circuit 154 is so designed as to take a difference between adjacent two points with respect to each of the $x$ and $y$ directions of the canonicalization pattern and store it. The so obtained differential patterns $f_x{}^{(k)}$ ($x$ direction) and $f_y{}^{(k)}$ ($y$ direction) are delivered to operation circuits 155 2 and 155- 3. The operation circuit 155 - 1 receives the reference pattern $f_0$ and carries out the following calculation:

$$\phi_1{}^{(k)} = \frac{f_0}{\|f_0\|} \tag{33}$$

The operation circuit 155 -2 receives the differential patterns $f_x$ and $f_y$ and carries out the following calculation:

$$\phi_2{}^{(k)} = \frac{1}{\sqrt{2(1+I)}}\left\{\frac{f_x}{\|f_x\|} + \frac{f_y}{\|f_y\|}\right. \tag{34}$$

The operation circuit 155 - 3 receives the differential patterns $f_x$ and $f_y$ and carries out the following calculation:

$$\phi_3{}^{(k)} = \frac{1}{\sqrt{2(1-I)}}\left\{\frac{f_x}{\|f_x\|} + \frac{f_y}{\|f_y\|}\right. \tag{35}$$

In the equations (34) and (35), I is given below:

$$I = \frac{(f_x, f_y)}{\|f_x\| \, \|f_y\|} \tag{36}$$

The norms $\|\phi_1{}^{(k)}\|$, $\|\phi_2{}^{(k)}\|$, and $\|\phi_3{}^{(k)}\|$ of the patterns $\phi_1{}^{(k)}$, $\phi_2{}^{(k)}$ and $\phi_3{}^{(k)}$ are all 1 and an inner product between $\phi_1, \phi_2$; $\phi_2, \phi_3$ and $\phi_3, \phi_1$ are all 0, satisfying an orthonormal relation.

The so obtained three orthonormal patterns are shown in FIGS. 14($a$) ($c$) and they are used as reference patterns. Referring back to FIG. 5, the output signals $a_1, a_2, \ldots a_M$ of the inner product calculating circuits are supplied to M number of squaring circuits 521, 522, . . . 52M where $$(f, \sqrt{\lambda_1}\,\phi_1{}^{(k)})^2, (f, \sqrt{\lambda_2}\phi_2{}^{(k)})^2, \ldots (f, \sqrt{\lambda_2}\,\phi_2{}^{(k)})^2$$

are calculated. The output signals $C_1, C_2 \ldots C_M$ of the squaring circuits are delivered to a first sum circuit 53 to produce a summed output $ik$. That is, the output ik is identical with $$\sum_{m=1}^{M} (f, \sqrt{\lambda_m}\phi_m{}^{(k)})^2$$

which is the first term of the lest side of the inequality (26).

The input pattern $f$ is simultaneously applied to N number of inner product calculating circuits 541, 542, . . . 54N, constituting a second group, where inner product calculations are effected between the input pattern $f$ and $$\sqrt{\mu_1}\,\psi_1{}^{(k)}, \sqrt{\mu_2}\,\psi_2{}^{(k)}, \ldots \sqrt{\mu_N}\,\psi_N{}^{(k)}$$

Here, the reference patterns $\psi_1{}^{(k)}, \psi_2{}^{(k)}, \ldots \psi_N{}^{(k)}$ are also obtained in the same procedure as in the case of $\phi_1{}^{(k)}, \phi_2{}^{(k)}, \ldots \phi_M{}^{(k)}$.

The output signals $b_1, b_2, \ldots b_N$ of the inner product calculating circuits are applied to N number of squaring circuits 551, 552, . . . 55N where $(f\sqrt{\mu_1}\,\psi_1{}^{(k)})^2 \ldots (f\sqrt{\mu_N}\,\psi_N{}^{(k)})^2$ are calculated. The output signals $d_1, d_2, \ldots d_N$ of the squaring circuits are applied to a second sum circuit 56 to produce a summed output $jk$. That is, the output $jk$ is identical with $$\sum_{n=1}^{N} (f, \sqrt{\mu_n}\psi_n{}^{(k)})^2$$

which is the second term of the left side of the inequality (26).

The input pattern f is simultaneously impressed to the other inner product calculating circuit 57 where $\|f\|^2$ is calculated. Since the input pattern f is applied as a sequence of L number of values $(f_1, f_2, \ldots f_L)$, the calculating content of $\|f\|^2$ is $$\|f\|^2 = \sum_{r=1}^{L} f_r^2 \tag{27}$$

The detailed circuit arrangement for performing the calculation of the equation (27) will be set out below.

The output signal $e$ of the inner product calculating circuit 57 is impressed to a coefficient multiplying circuit 58 where a coefficient $(1 - \epsilon)$ is multiplied.

The output $lk$ of the coefficient multiplying circuit and the output $jk$ of the second sum circuit are applied to another addition circuit 59 where a calculation of $jk + lk$ is effected. The output $pk$ of the addition circuit 59 is a value obtained by transporting the second term of the left side of the inequality (26) on the right side thereof.

The output $ik$ of the first sum circuit 53 and the output $pk$ of the addition circuit 59 are applied to a comparison circuit 60 where comparison is made between $ik$ and $pk$. When $ik > pk$ is satisfied, an output $qk$ appears from the comparison circuit 60. That is, when the inequality (26) is satisfied, the output $qk$ appears from the comparison circuit. The appearance of the output $qk$ shows that the input pattern $f$ belongs to $k$—$th$ one of K number of categories prepared.

Figure 6:
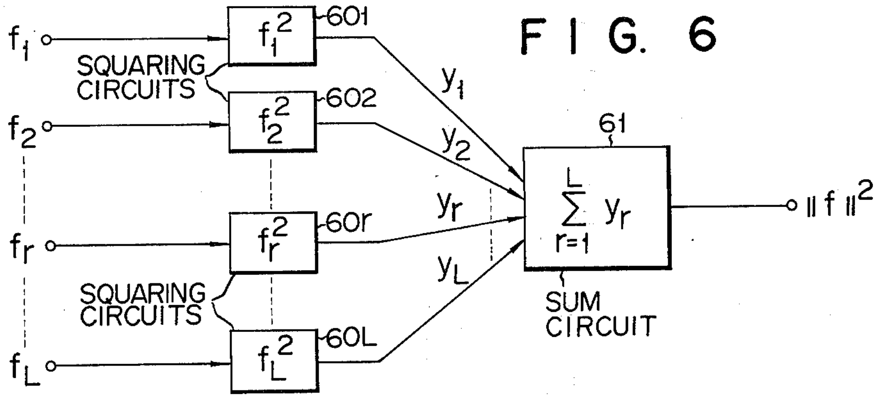
FIG. 6 is a block diagram for calculating the norm $\|f\|^2$ of an input signal value train.

FIG. 6 is a block diagram showing a circuit for carrying out the calculation of the above-mentioned equation (27). L number of input signals $f_1, f_2, \ldots f_r \ldots f_L$ are applied to squaring circuits 601, 602, . . . 60$r$ . . . 60L, respectively. After $f_1^2, f_2^2 \ldots f_r^2 \ldots f_L^2$ are calculated, the outputs of the squaring circuits are supplied to a sum circuit 61.

Figure 7:
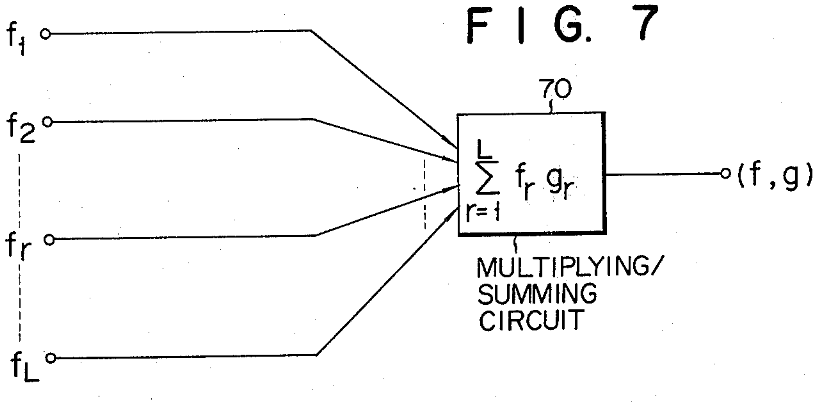
FIG. 7 is a block diagram showing a multiplying-summing circuit for obtaining the sum of inner products of two pattern functions.

FIG. 7 is a block diagram for carrying out the calculation of the above-mentioned equation (25). L number of input signals $f_1, f_2 \ldots f_L$ are applied to a multiplying-summing circuit 70 where a multiplying-summing calculation is electrically made between $f_1, f_2 \ldots f_L$ and $g_1, g_2 \ldots g_L$. $g_1, g_2 \ldots g_L$ can be given by determining the ratio of two electrical resistances to be later described.

Figure 8:
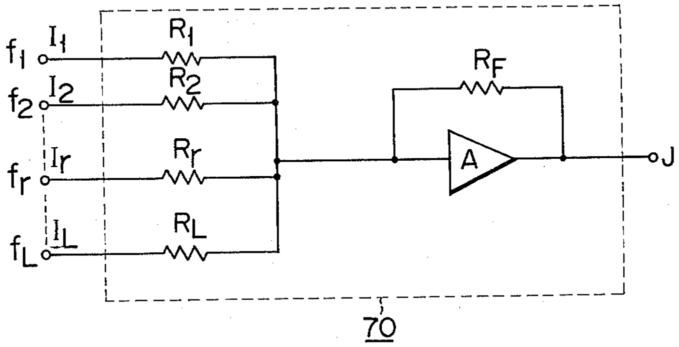
FIG. 8 is a detailed circuit arrangement of the multiplying-summing circuit of FIG. 7.

FIG. 8 is a circuit arrangement showing one example of the multiplying-summing circuit 70. Voltages proportional to the input signal $f_1 - f_r$, respectively, are applied to the input terminals $I_1 - I_L$ of the multiplying-summing circuit 70. A ratio $R_F/R_r$ of a feedback resistance $R_F$ to any one, for example, $R_r$ of resistances $R_1 - R_L$ is taken as a known value $g_r$. If an operational amplifier A is so selected to have a sufficiently high amplification factor, a voltage $$-\sum_{r=1}^{L}\frac{R_f}{R_r}f_r=-\sum_{r=1}^{L}g_rf_r \qquad (28)$$

is derived as an output from the output terminal J of the multiplying-summing circuit 70 based on the principle of a well known analog multiplying-summing circuit. The multiplying summing circuit shown in FIG. 8 can be applied to M number of inner product calculating circuits 511, 512, . . . 51M (the first group) and N number of inner product calculating circuits 541, 542 . . . 54N (the second group) both shown in FIG. 5. That is, the values $\sqrt{\lambda_1}\phi_1^{(k)}$, $\sqrt{\lambda_2}\phi_2^{(k)}$, . . . $\sqrt{\lambda_M}\phi_M^{(k)}$ and $\sqrt{\mu_1}\psi_1^{(k)}$, $\sqrt{\mu_2}\psi_2^{(k)}$, . . . $\sqrt{\mu_N}\psi_N^{(k)}$ are only required to be rewritten as the ratio $R_F/R_r$ of the resistance $R_F$ to the resistance $R_r$. The multiplying-summing circuit shown in FIG. 8 can be used not only as an inner product calculating circuit, but as a summing circuit for $$\sum_{r=1}^{L} f_r$$

(providing that $g_1=g_2=\ldots=g_L=1$). This can be applied to the first and second summing circuits 53 and 56 shown in FIG. 5. Let $L=1$ and $g_1=1$. Then, the multiplying-summing circuit of FIG. 8 can also be utilized as a circuit for obtaining an output $-f_1$ in which the sign of an input value $f_1$ is inversed.

Figure 9:
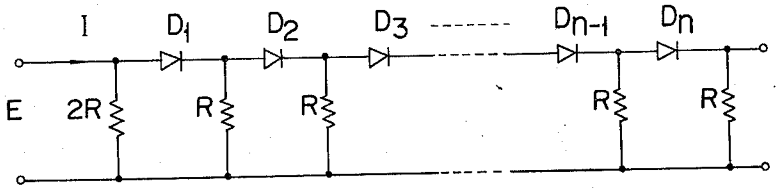
FIG. 9 is a view showing a circuit for effecting the approximation of a voltage-current characteristic to the characteristic curve of the squares with broken lines.

FIG. 9 is a detailed circuit arrangement showing one example of M number of squaring circuits 521, 522, . . . 52M (the first group) and N number of squaring circuits 551, 552, . . . 55M (the second group) as shown in FIG. 5. In the circuit arrangement of FIG. 9 N number of diodes $D_1 - D_n$ are serially connected between one pair of input and output terminals. Resistors R have one end connected to a junction between the adjacent diodes and the other end connected in common to a line between the other pair of input and output terminals with a compensation resistor 2R (having a resistance twice as great as that of the other resistors) connected between the input terminals. In the circuit arrangement shown, let an input voltage be represented by E; an electric current through the input terminal by I; and a forward voltage of each diode by Ed. Then, the following relation will be established.

$$E=n\,Ed$$

$$I=\frac{n\,Ed}{2R}+\frac{(n-1)Ed}{R}+\ldots+\frac{Ed}{R} \qquad (29)$$

From the equation (29)

$$I=\frac{Ed}{2R}[n+2(n-1)+2(n-2)+\ldots+2]$$

$$=\frac{Ed}{2R}\left[n+2\cdot\frac{(n-1)n}{2}\right]$$

$$=\frac{n^2Ed}{2R} \qquad (30)$$

If $n$ is eliminated from the equations (29) and (30), then $$I=\left(\frac{1}{2REd}\right)E^2$$

Figure 10:
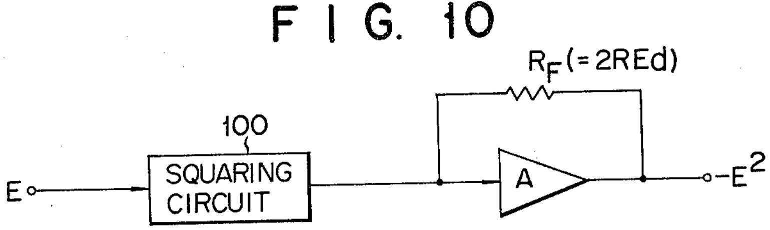
FIG. 10 shows one embodiment of a squaring circuit in FIG. 5.

From this it will be evident that the electric current I is proportional to the square of the input voltage. This means approximation to the characteristic curve of the squares with broken lines. Actually, however, the diodes do not show ideal broken line characteristics but exponential function characteristics, so that the squaring circuit will have a still better degree of approximation. As shown in FIG. 10, therefore, a squared output voltage value of $-E^2$ can be obtained with respect to an input voltage value of E by placing at the succeeding stage of the squaring circuit 100 shown in FIG. 9 a feedback amplifier A whose feedback resistance $R_F$ is selected to have a value of 2REd.

Figure 11:
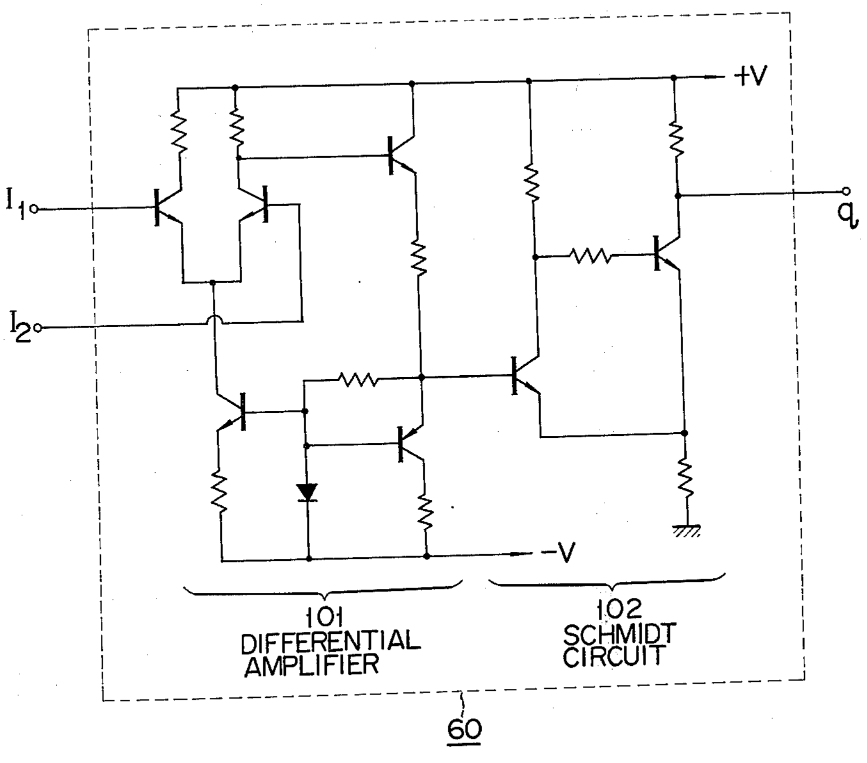
FIG. 11 is a detailed circuit arrangement showing one embodiment of a comparison circuit in FIG. 5.

FIG. 11 is a detailed circuit arrangement showing one example of the comparison circuit shown in FIG. 5.

The comparison circuit consists of a known differential amplifier section 101 and a known Schmidt circuit 102. Between the input terminals $I_1$ and $I_2$ of the differential amplifier 101 a difference signal is detected and amplified. In the Schmidt circuit section – when a difference signal of $I_1 - I_2$ is positive, an output signal of "1" saturated to a positive potential appears at an output terminal $g$. Conversely, when the difference signal is negative, an output signal of "0" saturated to a zero potential appears at the output terminal $q$.

In this way, the respective blocks of FIG. 5 are so constructed as shown in FIGS. 8 – 11 and the calculation of the equation (26) is carried out.

The output of the mixed similarity calculating circuit 5 i.e. the output $qk$ of the comparison circuit 60 is delivered, together with the other outputs $g1$, $g2$ . . . shown in FIG. 4, to the identification circuit 6. The identification circuit 6 makes, upon receipt of any one of the outputs $q1$ – $q$K of the calculation-comparison circuits 501 – 50K, an identification as to which category it belongs to. The identification can be easily effected by representing the outputs $q1$ – qK in coded form.

Figure 12:
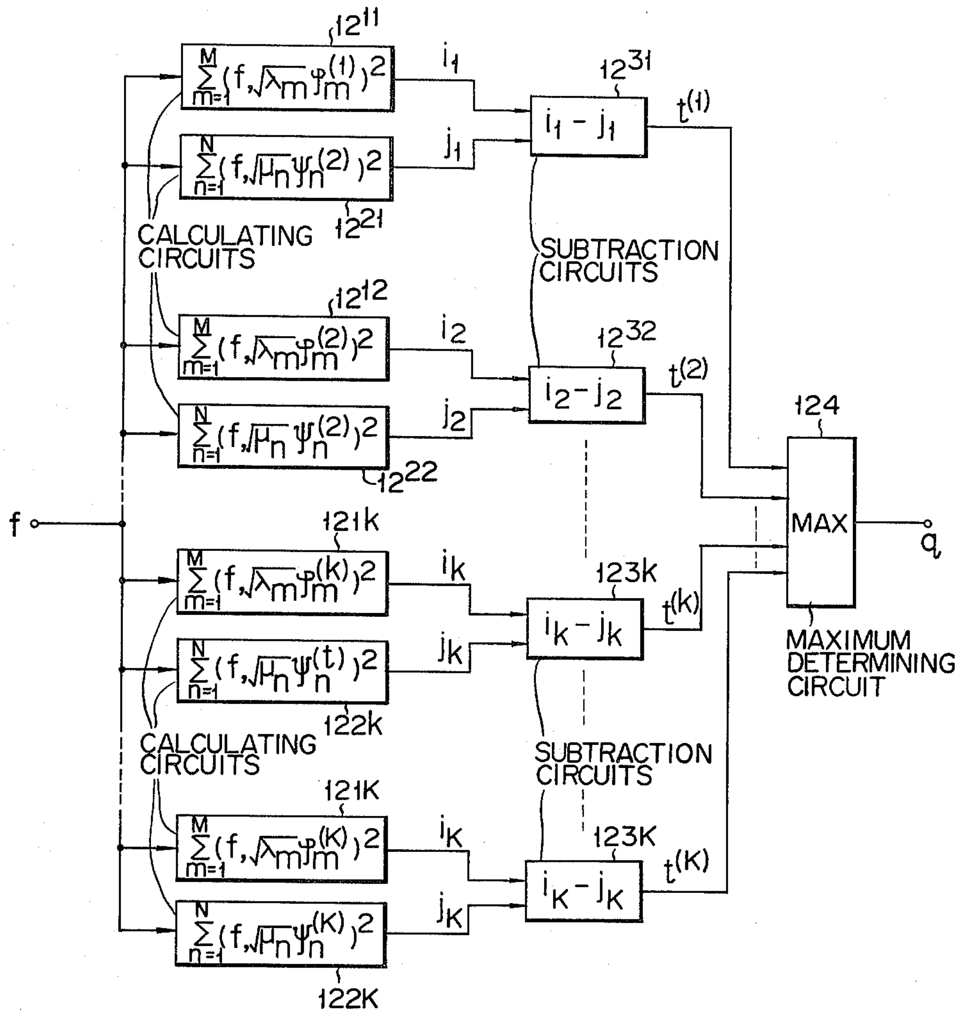
FIG. 12 is a block diagram showing another embodiment of a mixed similarity calculating circuit used in the pattern identification system of this invention.
Figure 14B:
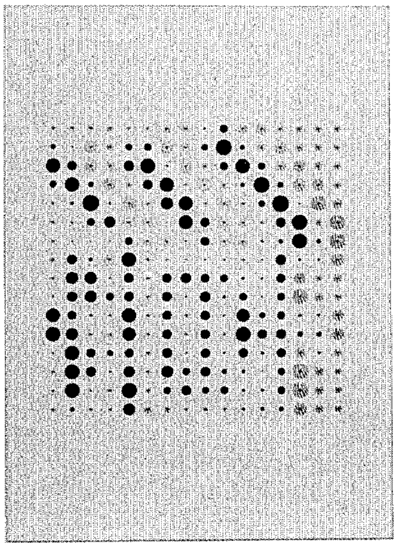
Figure 14D:
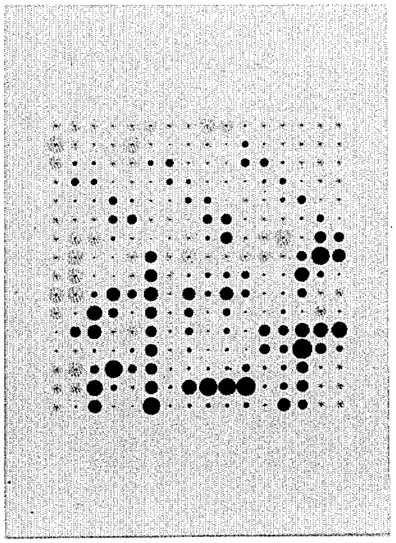
Figure 14A:
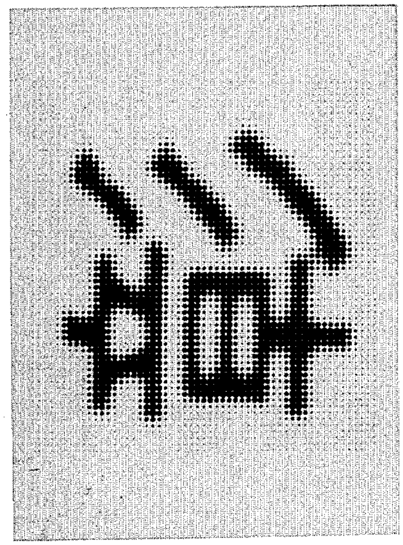
Figure 14C:
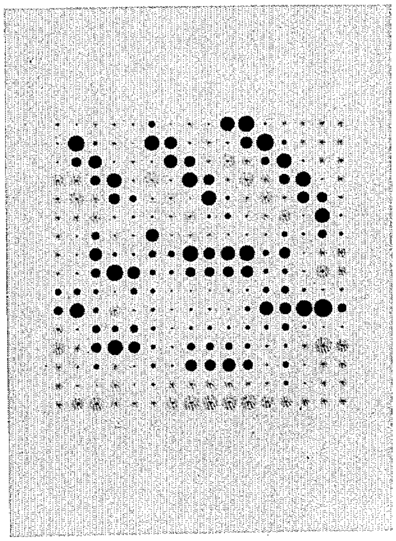

FIG. 12 is a block diagram showing the other embodiment of the mixed similarity calculating circuit 5 of the pattern identification apparatus according to this invention. In the embodiment of FIG. 5 identification is effected as to whether or not the inequality (26) can be satisfied. Since, however, it is apparent that the value, i.e. $(1-\epsilon)\ \|f\|^2$, of the left side of the equation (26) has no relevancy to $k$, , if $k$ is so selected that the value.

$$t^{(k)}=\sum_{m=1}^{M}(f,\sqrt{\lambda_m}\,\phi_m^{(k)})^2-\sum_{n=1}^{N}(f,\sqrt{\lambda_n}\,\psi_n^{(k)})^2 \qquad (32)$$

of the left side of the equation (26) becomes maximal, the identification that the input pattern f belongs to $k$–$th$ category may be made. The block diagram of FIG. 12 is so constructed based on this conception.

That is, the input pattern f is applied to a circuit for effecting calculation of $$\sum_{m=1}^{M} (f, \sqrt{\lambda_m}\,\phi_m^{(1)})^2, \quad \sum_{m=1}^{M} (f, \sqrt{\lambda_m}\,\phi_m^{(2)})^2, \quad \ldots$$

$$\sum_{m=1}^{M} (f, \sqrt{\lambda_m}\,\phi_m^{(k)})^2, \quad \ldots \quad \sum_{m=1}^{M} (f, \sqrt{\lambda_m}\,\phi_m^{(k)})^2 \quad \text{and}$$

$$\sum_{n=1}^{N} (f, \sqrt{\mu_n}\,\psi_n^{(1)})^2, \quad \sum_{n=1}^{N} (f, \sqrt{\mu_n}\,\psi_n^{(2)})^2, \quad \ldots$$

$$\sum_{n=1}^{N} (f, \sqrt{\mu_n}\,\psi_n^{(k)})^2, \quad \ldots, \quad \sum_{n=1}^{N} (f, \sqrt{\mu_n}\,\psi_n^{(k)})^2.$$

The calculation of $$\sum_{m=1}^{M} (f, \sqrt{\lambda_m}\,\phi_m^{(k)})^2$$

is carried out in the inner product calculating circuits 511 – 51M, squaring circuits 521 – 52M and sum circuit 53, while the calculation of $$\sum_{n=1}^{N} (f, \sqrt{\mu_n}\,\psi_n^{(k)})^2$$

is carried out in the inner product calculating circuits 541 – 54N, squaring circuits 551 – 55N and sum circuit 56.

Consequently, the outputs $il - iK$ of calculation circuits 1211 – 121K respectively can correspond to the output $ik$ of the sum circuit 53 shown in FIG. 5, while the outputs $jil - jK$ of calculation circuits 1221 – 122K respectively can correspond to the output $jk$.

Out of the outputs $il - iK$ and $jl - jK$, corresponding outputs bearing the same suffix are applied to subtraction circuits 1231, 1232, . . . 123k, . . . 123k where a difference between il - ik and jl - jk is taken. The outputs $t^{(1)}, t^{(2)}, \ldots t^{(k)}, \ldots t^{(K)}$ of the subtraction circuits 1231, 1232, . . . 123k, . . . 123K are delivered to a maximum determining circuit 124, where a maximum value $t^{(k)}$ of K number of values is determined. The circuits 124 produces an output signal J which is obtained by coding the category $k$ corresponding to the maximum value $t^{(k)}$. Such maximum determining circuit is already known in the art.

As explained above, according to this invention an electrical signal corresponding to any scanned pattern is fed, after pre-processed, to the identification circuit where there are provided, for each of K number of categories preset, M number of reference patterns $\{\phi_m^{(k)}(x)\}$ satisfying an orthonomal relation and N number of reference patterns $\{\psi_n^{(k)}(x)\}$ having those components representing an orthogonal relation to the reference pattern and satisfying the orthogonal relation with respect to each other which are included in those patterns showing a relatively high similarity to the $k$—$th$ one of the K number of categories and being regarded as belonging to a different category. In the identification circuit, identification is effected, through calculation of the equation (26), or (32), between the category-unknown input pattern and the individual reference pattern. As will be understood from the explanation made in connection with the mixed similarity method according to the principle of this invention, an emphasized discrimination between the input pattern and any easily confusable patterns belonging to a different category which could not have been attained based on the known simple similarity method and multiple similarity method can be realized according to this invention. According to this invention, therefore, a tolerant discriminatory evaluation is made with respect to deformation components allowed for the pattern belonging to the K$th$ category under consideration, while a severe discriminatory evaluation is made with respect to easily confusable components belonging to a different category. Consequently, a discrimination between a numerical figure "0" and an English letter "O", a numerical figure "1" and an English letter "I" etc. can be effected with high accuracy.

Though the pattern identification apparatus based on the mixed similarity method is constructed using the electrical circuits, such identification apparatus capable of exhibiting the same effect can be realized using optical filter circuits.

Figure 13:
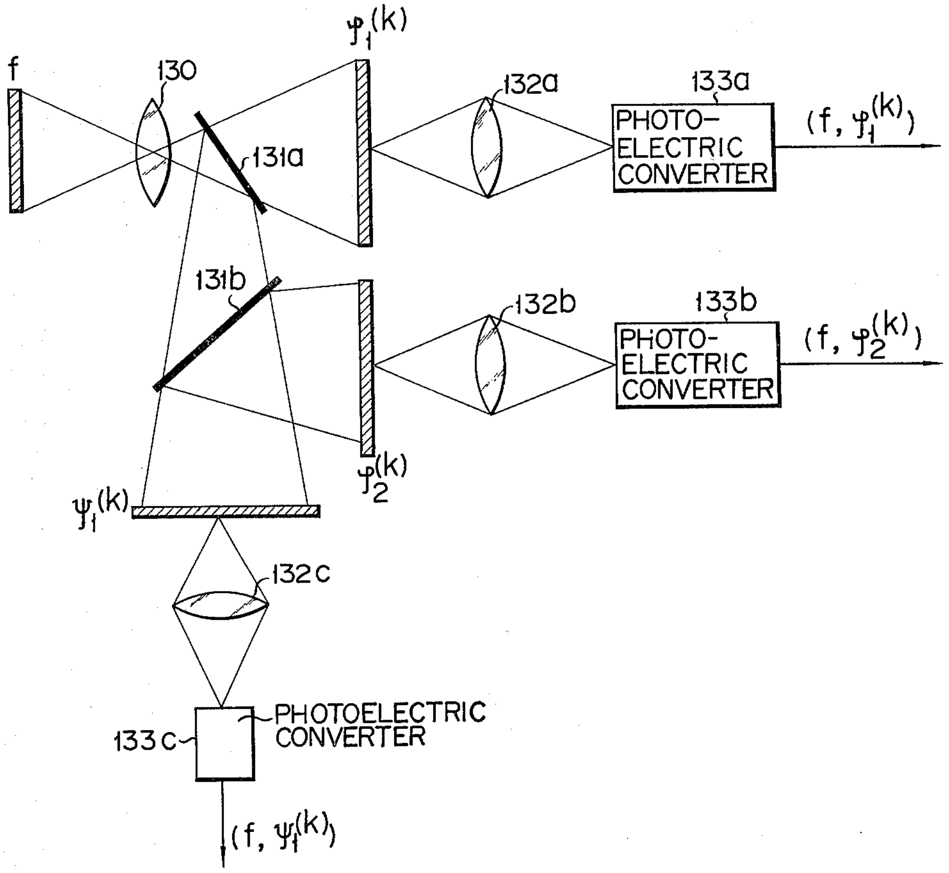
FIG. 13 is a schematic view showing another embodiment of this invention.

As shown in FIG. 13 a light beam corresponding to an input pattern f is, after focussed on an optical lens 130, divided using half mirrors 131*a* and 131*b*. In the embodiment shown, there is shown the case where $M = 2$ and $N = 1$. The light beam passed through the half mirror is superposed on reference patterns $\phi_1^{(k)}$, $\phi_2^{(k)}$, $\psi_1^{(k)}$ and directed through respective optical lenses 132*a*, 132*b*, 132*c* to photoelectric converters 133*a*, 133*b* and 133*c*.

The output signals of the photoelectric converters 133*a*, 133*b* and 133*c* appear after an inner product calculation is effected between each of the reference patterns $\phi_1^{(k)}$, $\phi_2^{(k)}$, $\psi_1^{(k)}$ and the input pattern f to be applied to, for example, the squaring circuits 521 – 52M and 551 – 55N of FIG. 5. The succeeding calculations are carried out as shown in FIG. 5.

Consequently, if the reference patterns $\phi_1^{(k)}$, $\phi_2^{(k)}$, $\psi_1^{(k)}$ are constructed as rotary filters to cover $\phi_1^{(1)} - \phi_1^{(K)}$, $\phi_2^{(1)} - \phi_2^{(K)}$, $\psi_1^{(1)} - \psi_1^{(K)}$, respectively, and the rotary filters are synchronously rotated, the same effect as attained in the electrical means of the above-mentioned embodiment is obtained in this case. According to this method it is unnecessary to provide the inner product calculating circuit which is required in the electrical means.

Though the above explanation is restricted to the identification of a "figure" pattern, this invention can also be applied to the identification of a sound. In this case, K number of reference sound patterns are preliminarily provided and identification as to which category a category unknown sound pattern belongs to can be effected, with high accuracy, based on the mixed similarity method. This will be easily understood taking into consideration the fact that a continuously inputted sound signals correspond to the equation (24).

What we claim is:

1. In a pattern identification system in which, based on the similarity of a category-unknown input pattern to any of category-known reference patterns, identification as to which category the input pattern belongs to can be effected, said pattern identification system comprising a first group of inner product calculating circuits adapted to effect an inner product calculation between the input pattern and each of M number of reference patterns preliminarily provided for each of K number of categories and showing an orthonomal relation; a second group of inner product calculating circuits adapted to effect an inner product calculation between the input pattern and each of N number of reference patterns provided for each of the categories, satisfying an orthonomal relation with respect to each other and having a orthogonal relation to each of the M number of reference patterns; a first group of squaring circuits for obtaining the squared value of an output from each of the inner product calculating circuits of said first group; a second group of squaring circuits for obtaining the squared value of an output from each of the inner product calculating circuits of said second group; first sum means for adding together outputs from the squaring circuits of said first group; second sum means for adding together outputs from the squaring circuits of said second group; and means for obtaining, from the first and second sum means provided for each category, a signal representating the similarity of the input pattern to the reference pattern.

2. A pattern identification system according to claim 1 further including first means for obtaining the square of a norm of the input pattern; second means for multiplying the square of the norm of the input pattern by a constant $(1 - \epsilon)$ where $\epsilon$ is a minimal value greater than a zero; third sum means for adding together the output of said second means and the output of the second sum means; and third means for comparing the output of the third sum means with the output of the first sum means to obtain a signal representing the similarity of the category-unknown input pattern to the category-known reference pattern.

3. A pattern identification system according to claim 2 in which said input pattern is given as a train of signals and said first means comprises a third group of squaring circuits for obtaining a squared value of the input pattern signal and a third sum means for adding together outputs from the third group of squaring circuits.

4. A pattern identification system according to claim 2 in which said input pattern is given as a train of signals, and said first and second groups of inner product circuits consists of a multiplying-summing circuit for obtaining a sum of each product arrived at by multiplying the value of individual signals of the input pattern signal train and the value of individual signals of the reference pattern signal train.

5. A pattern identification system according to claim 4 in which said multiplying-summing circuit comprises a plurality of resistors to which the individual signals of the input pattern signal train are supplied at one end thereof, an operational amplifier having an input terminal connected in common to the other end of said plurality of resistors, and a feedback resistor connected between the input and output terminals of the operational amplifier; the ratio between the resistance of the feedback resistor and the resistance of each of said plurality of resistors representing the individual value of said reference pattern.

6. A pattern identification system according to claim 2 in which said third means includes a differential amplifier having two input terminals to which the outputs of the first and third sum means are supplied, respectively; and a Schmidt circuit adapted to receive the output of said differential amplifier and produce an output "1" when a difference signal between input signals from the two input terminals is positive and an output "0" when the difference signal therebetween is negative.

7. A pattern identification system according to claim 1 in which said first and second squaring circuits each comprise a squaring circuit consisting of a pair of input terminals and a pair of output terminals, a plurality of diodes serially connected between the paired input and output terminals, a plurality of resistors each parelly parallely to a junction between the adjacent diodes to form a ladder network, and a compensation resistor having a resistance value two times greater than the resistance value of each of said resistors; and a feedback operational amplifier having a feedback resistor connected between the input and output terminals thereof and adapted to receive the output of the squaring circuit.

8. A pattern identification system according to claim 1 in which said first and second sum circuits comprise a plurality of resistors adapted to receive the individual output of said first group of squaring circuits or said second group of squaring circuits and having the same resistance value; and a feedback amplifier having an input terminal connected in common to the other end of said plurality of resistors and having a feedback resistance connected between the input and output terminals thereof; the resistance value of said feedback resistor being so selected as to be equal to the individual resistance value of said plurality of resistors.

9. A pattern identification system according to claim 1 in which said last-mentioned means includes a plurality of subtraction circuits for obtaining, with respect to each category, a difference between the outputs of the first and second sum means and a maximum determining circuit for determining a maximum one of the outputs of the subtraction circuits.

10. A pattern identification system according to claim 1 in which said M number of reference patterns and said N number of reference patterns are obtained from means for a sampling a sample pattern representative of the category and means for effecting canonicalization by subtracting the averaged density value of the sample pattern so prepared from each point of the sample pattern.

11. A pattern identification system according to claim 1 in which said M number of reference patterns and said N number of reference patterns are obtained from means for sampling a sample pattern representative of the category; means for effecting canonicalization by substracting the averaged density value of the sample pattern so prepared from each point of the sample pattern; means for obtaining differential patterns $f_x$ and $f_y$ relative to an X- and Y- directions, from a density difference between two points adjacent to each other in the X- Y- directions which are present in the canonicalized pattern $f_0$ obtained at the canonicalization means; and operating means for obtaining a plurality of reference patterns from the canonicalized pattern $f_0$ and differential patterns $f_x$ and $f_y$ relative to the X- and Y- direction.

12. A pattern identification system according to claim 11 wherein said operating means comprise an operating circuit for obtaining first, second and third reference patterns $\phi_1$, $\phi_2$ and $\phi_3$ represented by $$\phi_1 = \frac{f_0}{\|f_0\|}$$

$$\phi_2 = \frac{1}{\sqrt{2(1+I)}}\left\{\frac{f_x}{\|f_x\|} + \frac{f_y}{\|f_y\|}\right\}$$

$$\phi_3 = \frac{1}{\sqrt{2(1+I)}}\left\{\frac{f_x}{\|f_x\|} - \frac{f_y}{\|f_y\|}\right\}$$

where $\|f_0\|$ is a norm of the canonicalized pattern, and I is a ratio between the scalar product of $(f_x, f_y)$ and the product of $\|f_x\| \; \|f_y\|$.

13. In a pattern identification system in which, based on the similarity of a category-unknown optical input pattern to any of category-known optical reference patterns, identification as to which category the optical input pattern belongs to can be effected, said pattern identification system comprising means for inparting M number of optical reference patterns provided for K number of categories preset and satisfying an orthonomal relation with respect to each other; first optical means for optically superposing the optical input pattern on each of the M number of optical reference pattern; means for imparting N number of optical reference patterns provided for each of the categories, satisfying an orthonomal relation with respect to each other and having an orthogonal relation to each of the M number of reference patterns; second optical means for optically superposing the optical input pattern on each of the N number of optical reference pattern; first and second groups of photoelectric converters for converting the outputs of said first and second optical means into electrical signals; a first group of squaring circuits for obtaining the squared value of output signals from the respective photoelectric converters of said first group; a second group of squaring circuits for obtaining the squared value of output signals form the respective photoelectric converters of said second group; first sum means for adding together the outputs of the first squaring circuits of said first group; second sum means for adding together the outputs of the second squaring circuits of said second group; and means for obtaining from the output signals of said first and second sum means a signal representing the similarity of the input pattern to the reference pattern.

14. A pattern identification system according to claim 13 in which said first and second optical means respectively include a plurality of half mirrors for optically dividing a light beam corresponding to an optical input pattern.

15. A pattern identification system according to claim 13 in which there is further provided means for rotating M number of optical reference patterns and N number of optical feference patterns in a synchronized relation.

* * * * *